(12) United States Patent
Wang et al.

(10) Patent No.: US 11,314,539 B2
(45) Date of Patent: Apr. 26, 2022

(54) CLOUD STORAGE BASED DATA PROCESSING METHOD AND SYSTEM

(71) Applicant: Hangzhou Hikvision Digital Technology Co., Ltd., Zhejiang (CN)

(72) Inventors: Wei Wang, Zhejiang (CN); Qiqian Lin, Zhejiang (CN); Weichun Wang, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 503 days.

(21) Appl. No.: 16/338,160

(22) PCT Filed: Sep. 13, 2017

(86) PCT No.: PCT/CN2017/101637
§ 371 (c)(1),
(2) Date: Mar. 29, 2019

(87) PCT Pub. No.: WO2018/059238
PCT Pub. Date: Apr. 5, 2018

(65) Prior Publication Data
US 2019/0243676 A1    Aug. 8, 2019

(30) Foreign Application Priority Data

Sep. 30, 2016   (CN) .......................... 201610872653.8

(51) Int. Cl.
*G06F 16/78*    (2019.01)
*G06F 9/455*    (2018.01)
(Continued)

(52) U.S. Cl.
CPC ........ *G06F 9/45558* (2013.01); *G06F 3/0605* (2013.01); *G06F 3/067* (2013.01);
(Continued)

(58) Field of Classification Search
CPC ......... G06F 16/16; G06F 16/78; G06F 16/252
See application file for complete search history.

(56) References Cited

U.S. PATENT DOCUMENTS

| 9,369,433 B1 * | 6/2016 | Paul ..................... H04L 12/4633 |
| 2012/0060052 A1 | 3/2012 | White et al. |

(Continued)

FOREIGN PATENT DOCUMENTS

| CN | 102687149 A | 9/2012 |
| CN | 104796494 A | 7/2015 |

(Continued)

OTHER PUBLICATIONS

Requirements for cloud storage in visual surveillance; F. 743.2 (Jul. 2016), ITU-T Standard, International Telecommunication Union, Geneva, Jul. 14, 2016, pp. 1-15.

*Primary Examiner* — Eliyah S. Harper
(74) *Attorney, Agent, or Firm* — Bret E. Field; Bozicevic, Field & Francis LLP

(57) ABSTRACT

The embodiments of the present application disclose a data processing method and system based on cloud storage. The method includes: a cloud management device receiving a data query request sent by a client via a cloud work device, wherein the data query request is used to request for querying media data that has been stored in a cloud domain, the cloud work device is a default storage cloud domain of an IP camera; the cloud management device querying whether the media data collected by the IP camera is stored in a cloud backup device according to the data query request; and if the cloud management device determines that the media data of the IP camera is stored in the cloud backup device according to the data query request, pushing an address of the media data to the cloud work device, wherein the address of the media data is used for the client to request for querying the media data from the cloud backup device. The present (Continued)

application solves the technical problem of poor data storage flexibility among cloud domains in related arts.

14 Claims, 12 Drawing Sheets

(51) Int. Cl.
*G06F 3/06* (2006.01)
*H04L 67/55* (2022.01)
*G06F 16/25* (2019.01)
*H04L 67/1097* (2022.01)
*H04L 67/563* (2022.01)
*H04L 67/1095* (2022.01)
*H04N 1/00* (2006.01)
*G06F 16/735* (2019.01)
*H04L 67/62* (2022.01)

(52) U.S. Cl.
CPC ......... *G06F 3/0638* (2013.01); *G06F 16/252* (2019.01); *G06F 16/78* (2019.01); *H04L 67/1095* (2013.01); *H04L 67/1097* (2013.01); *H04L 67/26* (2013.01); *H04L 67/2814* (2013.01); *H04N 1/00204* (2013.01); *G06F 16/735* (2019.01); *G06F 2009/45583* (2013.01); *H04L 67/325* (2013.01)

(56) References Cited

U.S. PATENT DOCUMENTS

| | | | | |
|---|---|---|---|---|
| 2012/0240183 | A1* | 9/2012 | Sinha | H04L 63/1425 726/1 |
| 2013/0021475 | A1* | 1/2013 | Canant | H04N 5/33 348/144 |
| 2014/0223464 | A1* | 8/2014 | Moran | H04N 21/44222 725/12 |
| 2014/0267752 | A1 | 9/2014 | Huang | |
| 2015/0381943 | A1 | 12/2015 | Renkis | |
| 2016/0044105 | A1 | 2/2016 | Seed et al. | |
| 2016/0087933 | A1* | 3/2016 | Johnson | H04L 67/34 709/245 |
| 2017/0302685 | A1* | 10/2017 | Ladnai | H04L 63/1425 |
| 2017/0316085 | A1* | 11/2017 | Gupta | G06F 16/243 |
| 2019/0035091 | A1* | 1/2019 | Bi | H04N 5/247 |

FOREIGN PATENT DOCUMENTS

| | | |
|---|---|---|
| CN | 105681714 A | 6/2016 |
| CN | 105872047 A | 8/2016 |
| WO | WO2016080963 A1 | 5/2016 |

* cited by examiner

CLOUD STORAGE BASED DATA PROCESSING METHOD AND SYSTEM

The present application claims the priority to a Chinese patent application No. 201610872653.8, filed with the China National Intellectual Property Administration on Sep. 30, 2016 and entitled "CLOUD STORAGE BASED DATA PROCESSING METHOD AND SYSTEM", which is incorporated herein by reference in its entirety.

TECHNICAL FIELD

The present application relates to the field of video surveillance, and in particular to a data processing method based on cloud storage and system.

BACKGROUND

At present, the field of video surveillance has characteristics of huge data volume, high data security requirements, and data backup objects being historical data already generated. In addition, when involving urban-level video surveillance, the possibility of constructing a centralized data center to store and manage data in a unified manner is low due to scattered locations of various districts and counties. Therefore, it is more common to build an independent cloud storage system and conduct autonomous management in various districts and counties. However, this method has many inconveniences in data storage, management and maintenance, the management and control manners are relatively simple and the data storage manner is relatively rigid. In summary, there are technical problems in the related art that data storage flexibility among cloud domains is poor.

Regarding the above problems, no effective solution has been proposed.

SUMMARY

The embodiments of the present application provide a data processing method and system based on cloud storage, so as to at least solve the technical problem of poor data storage flexibility among cloud domains in the related art.

According to an aspect of the embodiments of the present application, a data processing method based on cloud storage is provided, the method includes: a cloud management device receiving a data query request sent by a client via a cloud work device, where the data query request is used to request for querying media data that has been stored in a cloud domain, where the cloud work device is a default storage cloud domain of an IP camera; the cloud management device querying whether the media data collected by the IP camera is stored in a cloud backup device according to the data query request; if the cloud management device determines that the media data of the IP camera is stored in the cloud backup device according to the data query request, pushing an address of the media data to the cloud work device, where the address of the media data is used for the client to request for querying the media data from the cloud backup device.

Further, the media data includes video data, and the data query request includes a first time period. The cloud management device querying whether the media data collected by the IP camera is stored in a cloud backup device according to the data query request includes: the cloud management device querying a storage trajectory of the IP camera in the first time period according to the data query request, wherein the storage trajectory records information on a cloud domain in which the video data is stored in each time period, and the cloud domain includes the cloud work device and the cloud backup device; the cloud management device determining whether the storage trajectory records information on the cloud backup device; and if it is determined that the storage trajectory records the information on the cloud backup device, determining that the video data collected by the IP camera is stored in the cloud backup device.

Further, pushing the address of the media data to the cloud work device includes: the cloud management device pushing the address of the media data to the cloud work device and pushing a time period associated with the video data stored in the cloud backup device to the cloud work device.

Further, the media data includes video data, and after the address of the media data is pushed to the cloud work device, the method further includes: the client, according to the address of the media data, requesting for video data stored during a first preset time period from the cloud backup device; the client receiving first video data returned by the cloud work device, where the first video data is video data stored in the cloud backup device during the first preset time period.

Further, the method further includes: determining, according to the storage trajectory of the IP camera, whether information on a data forwarding server in the cloud management device needs to be acquired when the cloud work device receives a request for acquiring the information on the data forwarding server sent by the client; if the cloud work device determines that the information on the data forwarding server in the cloud management device needs to be acquired, sending the information on the data forwarding server in the cloud management device to the client; and if the cloud work device determines that the information on the data forwarding server in the cloud management device does not need to be acquired, sending information on a data forwarding server in the cloud work device to the client.

Further, before the client sends a data query request via the cloud work device, the method further includes: the cloud management device caching user information when the user information in the cloud work device is acquired; and when the user information in the cloud work device is changed, the cloud management device acquiring the user information that is changed in the cloud work device according to a received user information change request and updating the user information that has been cached, wherein the user information change request is generated by the cloud work device according to a user right configuration of the client.

Further, the method further includes instructing the cloud backup device to perform user binding when the cloud management device receives a user binding request sent by the client, and instructing the cloud backup device to synchronize the user information when the cloud management device receives a user information synchronization request sent by the client.

Further, the method further includes: the cloud management device determining whether a fault occurs in the cloud work device, if the cloud management device determines that a fault occurs in the cloud work device, instructing the IP camera to store the media data in the cloud backup device.

According to another aspect of the embodiments of the present application, a data processing method based on cloud storage is further provided. The method includes: an IP camera sending media data collected by the IP camera to a cloud work device; the IP camera receiving a first instruction sent by a cloud management device, where the first instruction is used to instruct the IP camera to store the media data collected by the IP camera to a cloud backup device; and the IP camera storing the media data collected by the IP camera in the cloud backup device according to the first instruction.

Further, the media data includes picture data, and the IP camera sending the media data collected by the IP camera to the cloud work device includes: the IP camera requesting for first gateway information of the cloud work device from the cloud work device; after receiving the first gateway information of the cloud work device, the IP camera sending the picture data to a first gateway associated with the first gateway information; the IP camera receiving a first response sent by the first gateway, wherein the first response is used to indicate that the first gateway determines that the storage resource of the cloud work device is sufficient to store the picture data; the IP camera sending the picture data to the work cloud device via the first gateway.

Further, the IP camera storing the media data collected by the IP camera in the cloud backup device according to the first instruction includes: the IP camera acquiring an address of the media data in the first instruction; and the IP camera storing the media data in the cloud backup device according to the address.

Further, after the IP camera stores the media data collected by the IP camera in the cloud backup device according to the first instruction, the method further includes:

the IP camera receiving a second instruction sent by the cloud management device, where the second instruction is used to instruct the IP camera to store the media data collected by the IP camera to the cloud work device; and the IP camera storing the media data collected by the IP camera in the cloud work device according to the second instruction.

According to another aspect of the embodiments of the present application, a data processing system based on cloud storage is provided, where a cloud management device in the system includes: a first receiving unit, configured to receive a data query request sent by a client via a cloud work device, wherein the data query request is used to request for querying media data that has been stored in a cloud domain, where the cloud work device is a default storage cloud domain of an IP camera; a query unit configured to query whether the media data collected by the IP camera is stored in a cloud backup device according to the data query request; and a pushing unit, configured to push an address of the media data to the cloud work device if it determines that the media data of the IP camera is stored in the cloud backup device according to the data query request, where the address of the media data is used for the client to request for querying the media data from the cloud backup device.

Further, the media data includes video data, the data query request includes a first time period. The pushing unit includes: a query subunit, configured to query a storage trajectory of the IP camera in the first time period according to the data query request, wherein the storage trajectory records information on a cloud domain in which the video data is stored in each time period, the cloud domain including the cloud work device and the cloud backup device; a determining subunit, configured to determine whether the storage trajectory records information on the cloud backup device; a determining unit, configured to determine that the video data collected by the IP camera is stored in the cloud backup device if it is determined that the storage trajectory records the information on the cloud backup device.

Further, the pushing unit includes a pushing subunit, configured to push an address of the media data to the cloud work device, and to push a time period associated with the video data stored in the cloud backup device to the cloud work device.

Further, the media data includes video data, and the client in the system includes: a requesting unit, configured to request for video data stored during a first preset time period from the cloud backup device according to the address of the media data; and a second receiving unit, configured to receive first video data returned by the cloud work device, where the first video data is video data stored by the cloud backup device during the first preset time period.

Further, the cloud work device in the system includes: a first determining unit, configured to determine, according to the storage trajectory of the IP camera, whether information on a data forwarding server in the cloud management device needs to be acquired when receiving a request for acquiring the information on the data forwarding server sent by the client; a first processing unit, configured to send the information on the data forwarding server in the cloud management device to the client if it is determined that the information on the data forwarding server in the cloud management device needs to be acquired; a second processing unit is configured to send information on a data forwarding server in the cloud work device to the client if it is determined that the information on the data forwarding server in the cloud management device does not need to be acquired.

Further, the cloud management device in the system further includes: a first storage unit, configured to caching user information when the user information in the cloud work device is acquired; and a third processing unit, configured to acquire the user information that is changed in the cloud work device according to a received user information change request when the user information in the cloud work device is changed, and updating the user information that has been cached, wherein the user information change request is generated by the cloud work device according to a user right configuration of the client.

Further, the cloud management device in the system further includes: a first instructing unit, configured to instruct the cloud backup device to perform user binding when receiving a user binding request sent by the client; and a second instructing unit, configured to instruct the cloud backup device to synchronize the user information when receiving a user information synchronization request sent by the client.

Further, the system further includes: a second determining unit, configured to determine whether a fault occurs in the cloud work device; and a second storage unit, configured to instruct the IP camera to store the media data in the cloud backup device if it is determined that a fault occurs in the cloud work device.

According to another aspect of the embodiments of the present application, a data processing system based on cloud storage is provided. An IP camera in the system includes: a sending unit, configured to send media data collected by the IP camera to a cloud work device; a third receiving unit, configured to receive a first instruction sent by a cloud management device, where the first instruction is used to instruct the IP camera to store the media data collected by the IP camera to a cloud backup device; and a third storage unit, configured to store the media data collected by the IP camera in the cloud backup device according to the first instruction.

Further, the media data includes picture data, and the sending unit includes: a requesting subunit, configured to request for first gateway information of the cloud work device from the cloud work device; a first sending subunit, configured to send the picture data to a first gateway associated with the first gateway information after receiving the first gateway information of the cloud work device; a receiving subunit, configured to receive a first response sent by the first gateway, wherein the first response is used to indicate that the first gateway determines that the storage resource of the cloud work device is sufficient to store the picture data; a second sending subunit, configured to send the picture data to the work cloud device via the first gateway.

Further, the third storage unit includes: an acquiring subunit, configured to acquire an address of the media data in the first instruction; and a storage subunit, configured to store the media data in the cloud backup device according to the address.

Further, the cloud management device in the system further includes: a fourth receiving unit, configured to receive a second instruction sent by the cloud management device, where the second instruction is used to instruct the IP camera to store the media data collected by the IP camera to the cloud work device; and a fourth storage unit, configured to store the media data collected by the IP camera in the cloud work device according to the second instruction.

According to another aspect of the embodiments of the present application, an electronic device is provided, including a processor, a communication interface, a memory, and a communication bus, wherein the processor, the communication interface, and the memory communicate with each other via the communication bus.

The memory is configured to store a computer program.

The processor is configured to implement any of the above data processing method based on cloud storages when executing the program stored in the memory.

According to another aspect of embodiments of the present application, a computer readable storage medium is provided, in which a computer program is stored. The computer program is executed by a processor to implement any of the above data processing method based on cloud storage.

According to another aspect of embodiments of the present application, a computer program is also provided. The computer program, when executed, implements any of the above data processing method based on cloud storage.

In the embodiments of the present application, the cloud management device receives the data query request sent by the client via the cloud work device, and queries whether the media data collected by the IP camera is stored in the cloud backup device by using the data query request, and pushes the address of the media data to the cloud work device if the cloud management device determines that the media data of the IP camera is stored in the cloud backup device. In this way, in the case that data is not sent back in the cloud backup device, the system is still able to work normally via the cloud work device. Therefore, the technical problem of poor data storage flexibility among cloudy domains in related arts is solved, thereby realizing the diversity of management and control among multiple cloud domains and improving the continuity of video surveillance.

BRIEF DESCRIPTION OF THE DRAWINGS

In order to illustrate the embodiments of the present application and the technical solutions of the prior art more clearly, the embodiments and the drawings used in the prior art will be briefly introduced hereinafter. Obviously, the drawings in the following description are only some embodiments of the application, other drawing may also be obtain based on these drawings by those of ordinary skill in the art without any creative efforts.

DETAILED DESCRIPTION

In order to make the objects, technical solutions, and advantages of the present application more comprehensible, the present application will be further described in detail below with reference to the accompanying drawings and embodiments. It is apparent that the described embodiments are only a part of the embodiments of the present application, and not all of them. All other embodiments obtained by a person of ordinary skill in the art based on the embodiments of the present application without any creative efforts fall within the protection scope of the present application.

Embodiment 1

An embodiment of the present application provides a data processing method based on cloud storage. It should be noted that steps shown in flowcharts of the accompanying drawings may be executed in a computer system comprising such as a set of computer executable instructions. Further, the steps shown and described may be performed in a different order than that described herein, although a logical order is shown in the flowchart.

Figure 1:
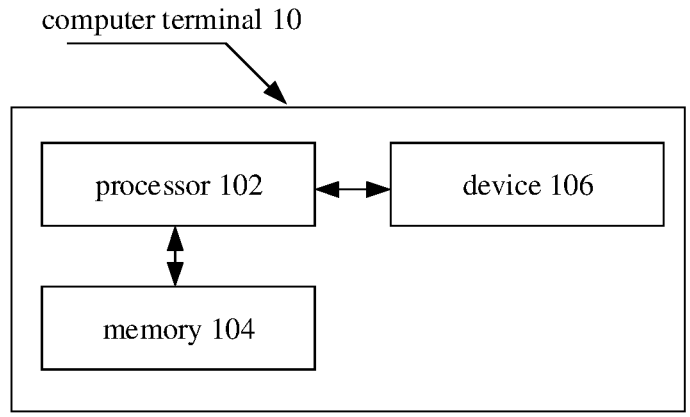
FIG. 1 is a block diagram showing the hardware structure of a computer terminal for executing an optional data processing method based on cloud storage according to the related art.

The method embodiment provided in Embodiment 1 of the present application can be executed in a mobile terminal, a computer terminal or the like. Taking that the method is executed in a computer terminal as an example, FIG. 1 is a block diagram showing the hardware structure of the computer terminal for executing the data processing method based on cloud storage according to the present embodiment. As shown in FIG. 1, the computer terminal 10 may include one or more (only one is shown in FIG. 1) processor 102 (processor 102 may include, but is not limited to, a processing device such as a microprocessor MCU or a programmable logic device FPGA), a memory 104 for storing data, and a transmission module 106 with communication functions. It will be understood by those skilled in the art that the structure shown in FIG. 1 is merely illustrative and does not limit the structure of the above electronic device. For example, the computer terminal 10 may also include more or fewer components than those shown in FIG. 1, or have a different configuration than that shown in FIG. 1.

The memory 104 may be used to store software programs and modules of an application software, such as program instructions/modules corresponding to the data processing method based on cloud storage in the embodiment of the present application. The processor 102 performs various functional applications and data processing by running the software programs and modules stored in the memory 104; that is to implement a vulnerability detection method of the above application program. Memory 104 may include a high speed random access memory, and may also include a non-volatile memory such as one or more magnetic storage devices, flash memory, or other non-volatile solid state memory. In some examples, memory 104 may further include a memory remotely located relative to the processor 102, which may be coupled to the computer terminal 10 via a network. Examples of such networks include, but are not limited to, the Internet, intranets, local area networks, mobile communication networks, and combinations thereof.

Transmission device 106 is used for receiving or transmitting data via a network. A specific example of the network described above may include a wireless network provided by a communication provider of the computer terminal 10. In an example, the transmission device 106 includes a Network Interface Controller (NIC) that can be connected to other network devices via a base station to communicate with the Internet. In an example, the transmission device 106 can be a Radio Frequency (RF) module for communicating with the Internet wirelessly.

Figure 2:
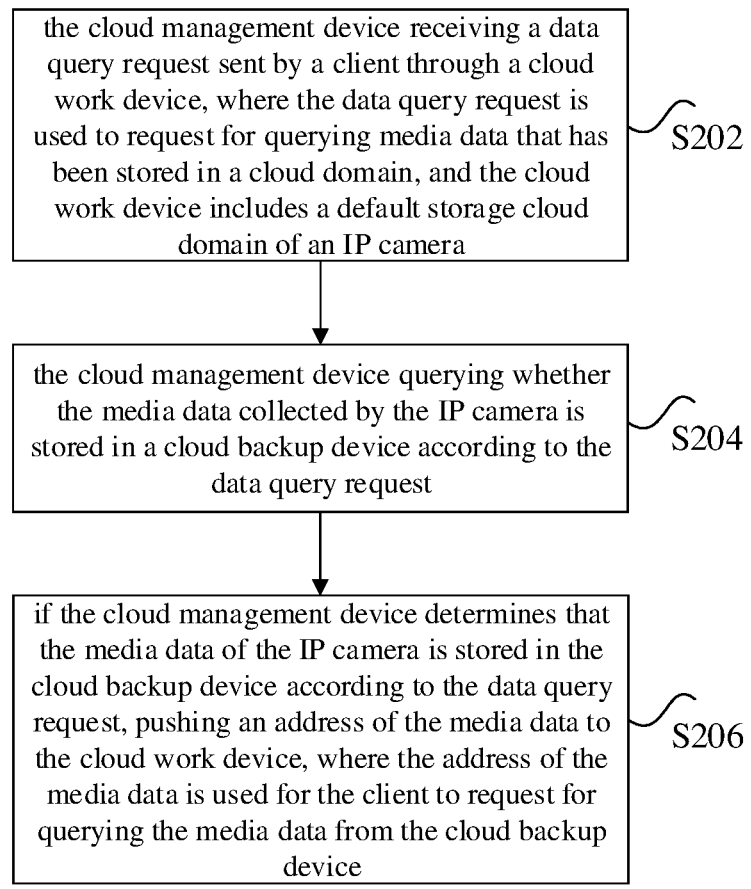
FIG. 2(a) is a schematic flowchart diagram of an optional data processing method based on cloud storage according to an embodiment of the present application.
FIG. 2(b) is a schematic structural diagram of an optional data processing method based on cloud storage according to an embodiment of the present application.
Figure 2:
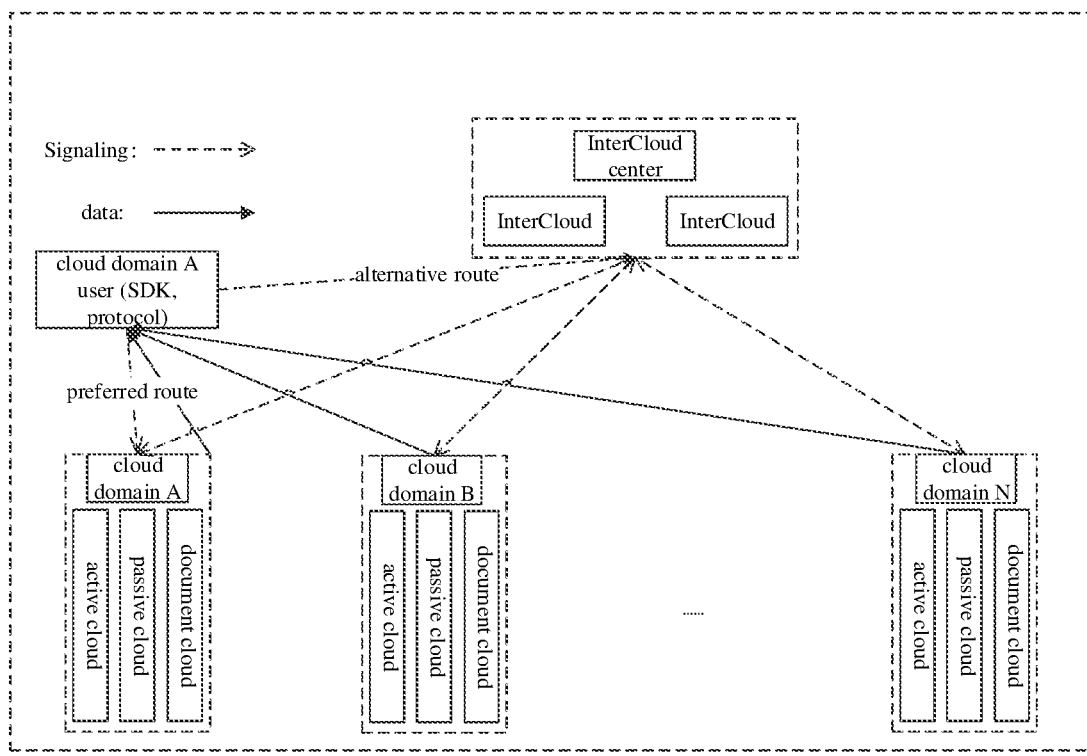

In the above operating environment, the present application provides a schematic flowchart of an optional data processing method based on cloud storage. As shown in FIG. 2(*a*), the data processing method based on cloud storage may include:

Step S202, a cloud management device receiving a data query request sent by a client via a cloud work device, where the data query request is used to request for querying media data that has been stored in a cloud domain, and the cloud work device includes a default storage cloud domain of an IP camera;

Step S204, the cloud management device querying whether the media data collected by the IP camera is stored in a cloud backup device according to the data query request;

Step S206, if the cloud management device determines by query that the media data of the IP camera is stored in the cloud backup device according to the data query request, pushing an address of the media data to the cloud work device, where the address of the media data is used for the client to request for querying the media data from the cloud backup device.

The above cloud management device, also referred to as a Cloud Manage Center (CMC) or an InterCloud, is a hardware device based on video cloud storage, and generally does not store data, but is used for strategy management and scheduling. For example, the cloud management device can be used to manage a switching strategy between a cloud work device and a cloud backup device, monitor the working state of each hardware under its supervision, and perform scheduling according to a configured strategy.

The above cloud work device (referred to as a Work Cloud) is used to store media data under normal circumstances. The above cloud backup device (referred to as a Backup Cloud) is used to store media data under abnormal circumstances.

The above cloud work device and cloud backup device may be collectively referred to as a cloud domain. The cloud domain (that is, a domain of the video cloud storage system) can use a cluster application, a grid technology, and a distributed technology to gather several storage devices in the network to work collaboratively and jointly provide video data storage and services access functions. That is to say, a cloud domain may include several storage devices that work collaboratively based on the network, and storage devices in a cloud domain may include three types: active cloud devices, passive cloud devices, and file cloud devices. In this way, the cloud work device is a default storage cloud domain of media data under normal circumstances, and includes several storage devices that work collaboratively based on the network; the cloud backup device is a storage cloud domain of media data under abnormal circumstances, and includes several storage devices that work collaboratively based on the network.

The IP camera captures corresponding media data, and a platform user sends a recording plan (including information of the IP camera, a time period of the media data required to be stored, etc.) to an active cloud device, the active cloud device actively obtains the media data from the IP camera according to the recording plan and stores the media data in a passive cloud device. In this way, the passive cloud device acts only as a carrier of the data storage, and does not need to know the sender, the sending manner, and the sending path of the data.

In the embodiments of the present application, the cloud management device receives the data query request sent by the client via the cloud work device, and queries whether the media data collected by the IP camera is stored in the cloud backup device by using the data query request, and pushes the address of the media data to the cloud work device if the cloud management device determines by query that the media data of the IP camera is stored in the cloud backup device. In this way, in the case that data is not sent back in the cloud backup device, the system is still able to work normally via the cloud work device. Therefore, the technical problem of poor data storage flexibility among cloudy domains in related arts is solved, thereby realizing the diversity of management and control among multiple cloud domains and improving the continuity of video surveillance.

The above IP camera is an Internet Protocol Camera (IPC). It should be noted that it can be referred to as a snapshot machine in the embodiment of the present application.

Optionally, the client can send a data query request via an API (Application Programming Interface). For different users or enterprises, it is possible to formulate system interface standards that meet their actual needs. For example, the system interface standard can be an open API.

Optionally, the cloud management device is situated above the video cloud storage system architecture, and can perform media data management or troubleshooting on multiple cloud domains. To ensure system reliability, the cloud management device generally supports a cluster architecture and has HA (High Availability). In addition, the cloud management device can support a configuration of manual or automatic switching strategy, and then switch a media data acquisition process in an abnormal cloud to a normal cloud according to the switching strategy, thereby ensuring the continuity of the execution of the media data acquisition process. In addition, if the abnormal cloud returns to normal, it can continue to execute the media data acquisition process and perform media data transmission according to the preset strategy. For example, the media data in the cloud backup device can be transmitted back to the cloud work device, thereby ensuring the normal operation of services based on cloud storage, such data request, data playback, data download and the like. It should be noted that the above automatic switching policy only supports switching when the cluster capacity is insufficient.

Optionally, FIG. 2(b) is a schematic structural diagram of an optional data processing method based on cloud storage. As shown in FIG. 2(b), the cloud management device can be configured with a switching strategy, and perform signaling and data transmission among the cloud work device domain and several backup cloud domains (cloud domain A, cloud domain B . . . cloud domain N). The cloud domain A is a cloud work device, and the client can use an SDK (Software Development Kit) or an access protocol to send a data query request to the cloud management device via the cloud work device. It should be noted that the cloud management device supports multiple backup cloud domains. When switching policies, the cloud management device can select an optimal backup cloud according to the running states of the backup cloud domains.

Optionally, the data processing method based on cloud storage provided in the embodiment of the present application may perform disaster recovery processing on real-time data acquired by the IP camera. Specifically, the cloud storage may have a built-in stream taking module to taking the media data stream of the front-end IP camera and store the media data in a cloud storage device when performing a media data acquisition process.

Optionally, the IP camera is a digital device based on network transmission. In addition to the common composite video signal output interface (in general, an analog output is used for debugging, it does not represent its own effect), the IP camera also has a network output interface, which can directly connect the camera to a local network. Each IP camera has its own IP address, data processing function and built-in application software, which can be used as a web server, FTP (File Transfer Protocol) server, FTP client and mailbox client. The IP camera also includes other special functions such as motion detection, alarm signal output/input, and mail functions.

Optionally, the cloud backup device adopts the Disk To Disk To Cloud technology, and can provide data protection (DP), disaster recovery (DR), and service continuity services for individual users or enterprises of various scales. That is, the target location stored in the cloud backup device is not on the local computer or local network, but in the cloud. It should be noted that cloud is a software platform that uses Application Virtualization technology, which integrates functions of search, download, usage, management, backup, and storage.

Optionally, the data processing method based on cloud storage provided in the embodiment of the present application can not only implement unified management and scheduling among multiple cloud domains and automatic switching among the cloud services in a relatively reliable manner, but also provide strong support on application of a large-scale security for the cloud storage system. In addition, the data processing method based on cloud storage provided in the embodiment of the present application can also perform disaster recovery processing on real-time data, thereby avoiding video surveillance data loss and ensuring services continuity.

Figure 3:
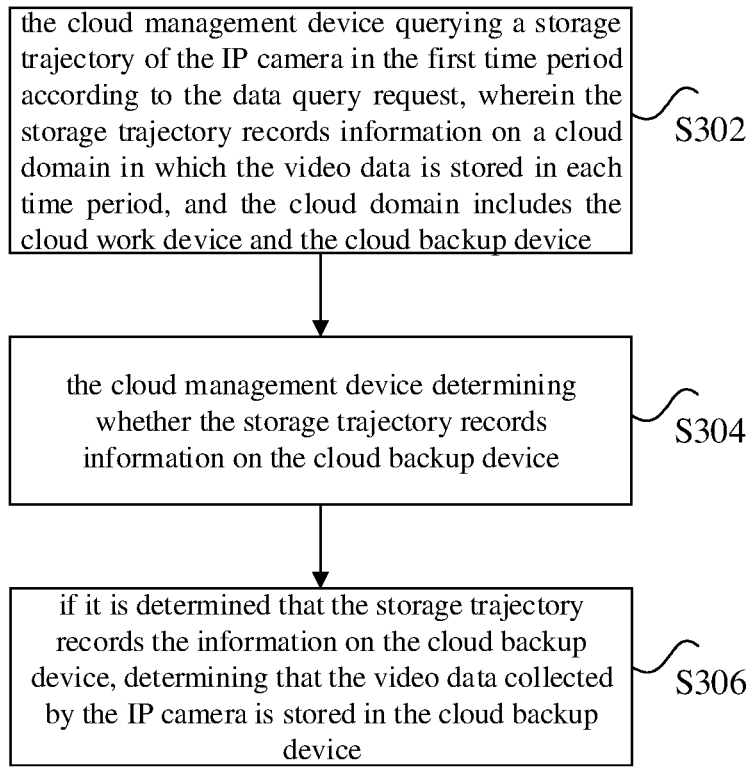
FIG. 3 is a schematic flowchart diagram of another optional data processing method based on cloud storage according to an embodiment of the present application.

Optionally, FIG. 3 is a schematic flowchart of another optional data processing method based on cloud storage according to an embodiment of the present application. As shown in FIG. 3, media data includes video data, and a data query request includes a first time period. Step S104 of the cloud management device querying whether the media data collected by the IP camera is stored in a cloud backup device according to the data query request includes:

Step S302, the cloud management device querying a storage trajectory of the IP camera in the first time period according to the data query request, wherein the storage trajectory records information on a cloud domain in which the video data is stored in each time period, and the cloud domain includes a cloud work device and a cloud backup device;

Step S304, the cloud management device determining whether the storage trajectory records information on the cloud backup device;

Step S306, if it is determined that the storage trajectory records the information on the cloud backup device, determining that the video data collected by the IP camera is stored in the cloud backup device.

Optionally, switching trajectory can record the time when the IP camera switches to the cloud backup device domain to store the video data. When the video data query is performed, the cloud management device may, according to the query time of the client, determine a storage area of the video data corresponding to the query time in a corresponding manner. That is to say, in order to reduce the pressure of the cloud management device, the video data can preferentially interact with the current cloud work device, and in turn the current cloud work device performs data interaction with the cloud management device according to the switching trajectory. It should be noted that the media data may be video data or picture data.

Optionally, switching trajectory can also be regarded as an execution state of a data processing strategy based on cloud storage. For example, when the video data query is performed, if the local cloud work device is normal, the API of the client only queries the local cloud work device. The local cloud work device determines whether to forward a data query request to the cloud management device according to the strategy execution state (i.e., the switching trajectory), and in turn, if the cloud management device receives the data query request, the result of query is summarized. In addition, if the local cloud work device is abnormal, the API of the client may directly send a data query request to the cloud management device according to a preset configuration. It should be noted that determining whether the local cloud work device is normal can be implemented based on the API. When the API is in the working state, the IP (Internet Protocol) address and Port of the cloud work device are configured and a session request is initiated. If the session request is reachable, it is determined that the local cloud work device works normally; if the session request is unreachable, it is determined that the local cloud work device works abnormally.

Optionally, switching trajectory can also be used for playback of the video data. Specifically, if the local cloud work device works normally, the API of the client only queries CDT (Cloud Data Transfer) information of the local cloud work device. The local cloud work device determines whether to obtain CDT information from the cloud management device according to the strategy execution state (i.e., the switching trajectory). In turn, if the cloud management device receives the data acquisition request, the data query request is forwarded and the acquired result is summarized. In addition, if the local cloud work device works abnormally, the API of the client can directly send a CDT information acquisition request to the cloud management device according to a preset configuration. Based on the above, the client can obtain CDT information list and time information by API to perform complete video data playback.

Optionally, in step S106, pushing the address of the media data to the cloud work device may include: the cloud management device pushing the address of the media data to the cloud work device, and pushing the time period associated with the video data stored in the cloud backup device to the cloud work device.

Figure 4:
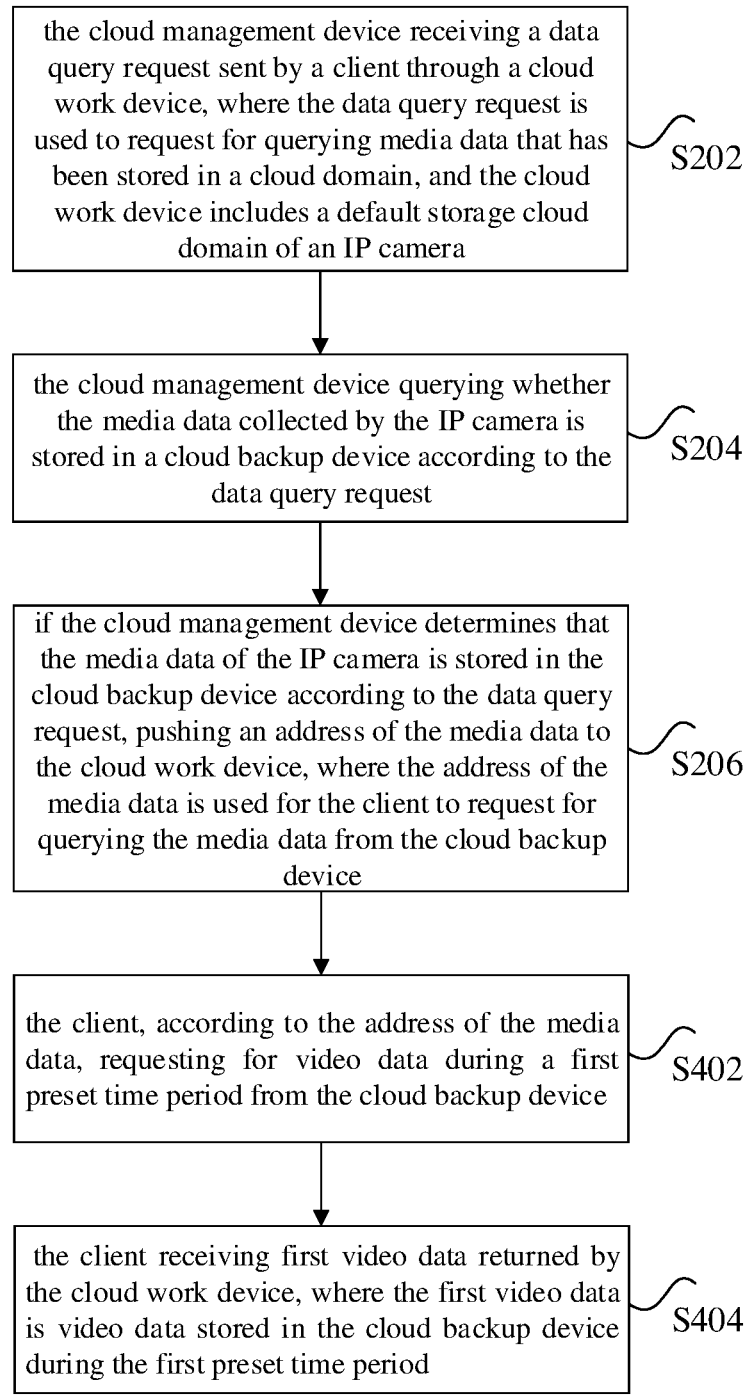
FIG. 4(a) is a schematic flowchart diagram of another optional data processing method based on cloud storage according to an embodiment of the present application.
FIG. 4(b) is a schematic flowchart diagram of another optional data processing method based on cloud storage according to an embodiment of the present application.
Figure 4:
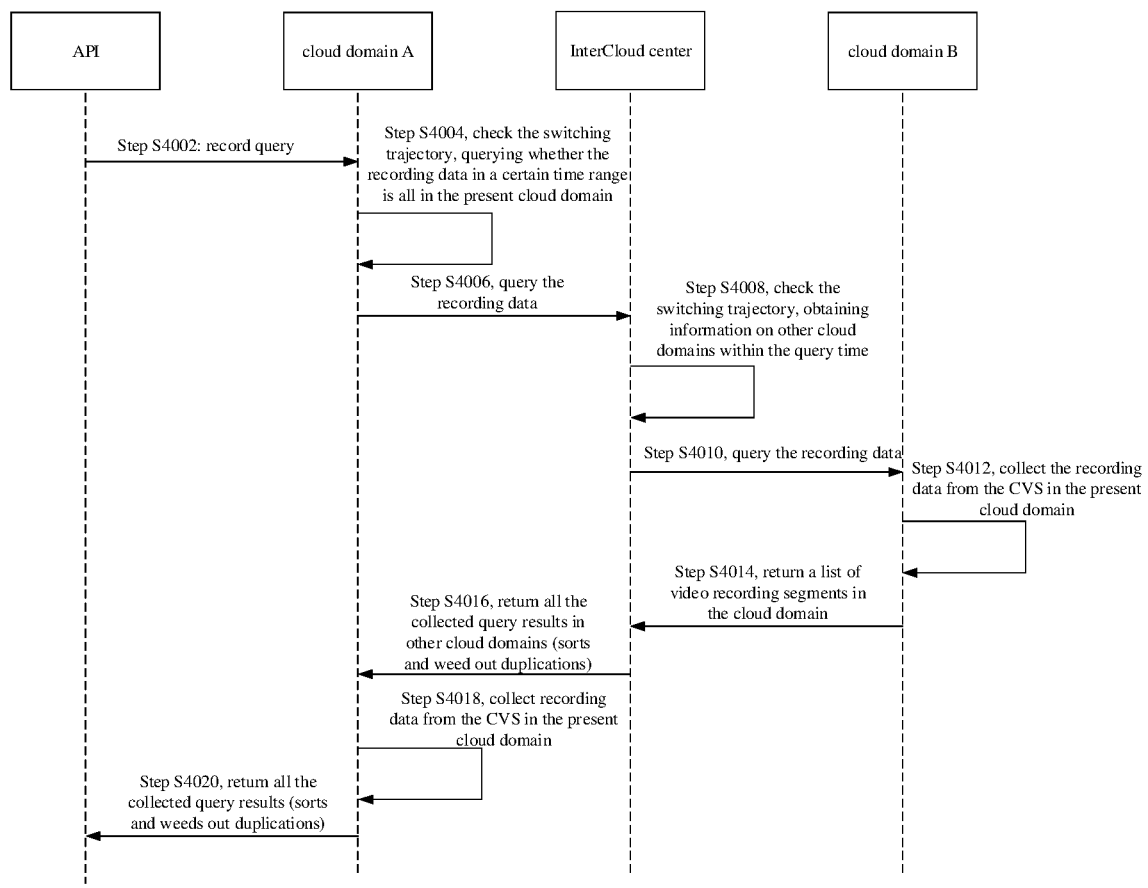

Optionally, FIG. 4(a) is a schematic flowchart of another optional data processing method based on cloud storage according to an embodiment of the present application. As shown in FIG. 4(a), the media data includes video data, and after step S206, that is, after pushing the address of the media data to the cloud work device, the method further includes:

Step S402, the client, according to the address of the media data, requesting the cloud backup device for video data stored during a first preset time period;

Step S404: the client receiving first video data returned by the cloud work device, where the first video data is video data stored in the cloud backup device during the first preset time period.

For example, FIG. 4(b) is a schematic flowchart of another optional data processing method based on cloud storage according to an embodiment of the present application. As shown in FIG. 4(b), the data processing method based on cloud storage may also include the following steps.

Step S4002: the API of the client performs a recording query on the cloud domain A;

Step S4004, the cloud domain A checks the switching trajectory, and queries whether recording data is all in the present cloud domain in a certain time range;

Step S4006, the cloud domain A queries for the recording data from the InterCloud;

Step S4008, the InterCloud checks the switching trajectory, and obtains information on other cloud domains within the query time;

Step S4010, the InterCloud queries a cloud domain B for the recording data;

Step S4012, the cloud domain B collects the recording data from CVS in the present cloud domain;

Step S4014, the cloud domain B returns to the InterCloud a list of video recording segments in the present cloud domain;

Step S4016, the InterCloud returns all the collected query results in other cloud domains (for example, the cloud domain B) to the cloud domain A, and sorts the query results and weeds out duplications;

Step S4018, the cloud domain A collects recording data from the CVS in the present cloud domain;

Step S4020, the cloud domain A returns all the collected query results to the API, and sorts the query results and weeds out duplications.

Figure 5:
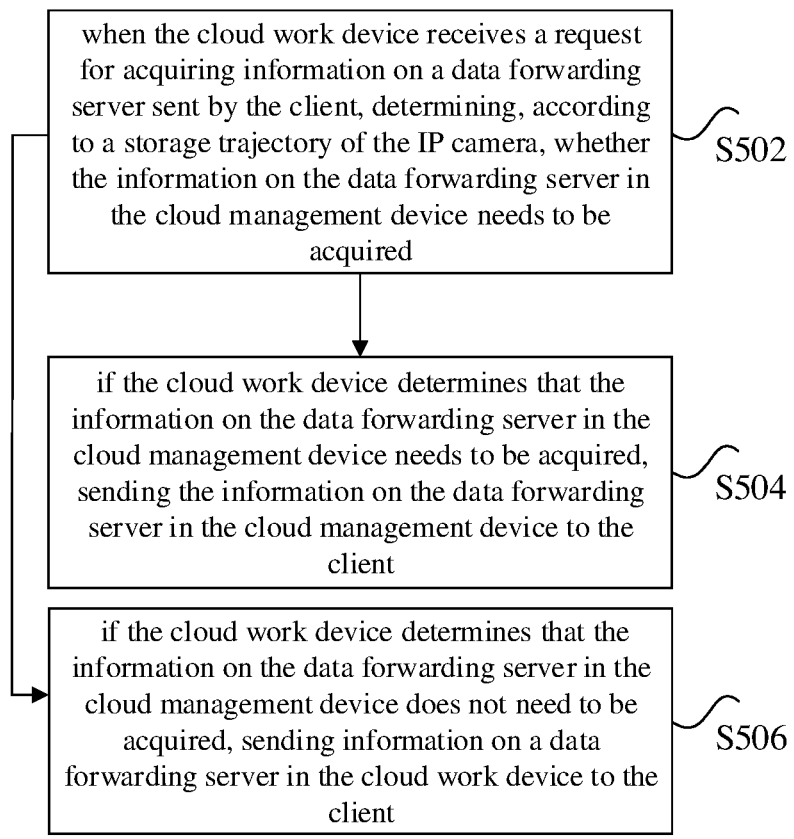
FIG. 5(a) is a schematic flowchart diagram of another optional data processing method based on cloud storage according to an embodiment of the present application.
FIG. 5(b) is a schematic flowchart diagram of another optional data processing method based on cloud storage according to an embodiment of the present application.
Figure 5:
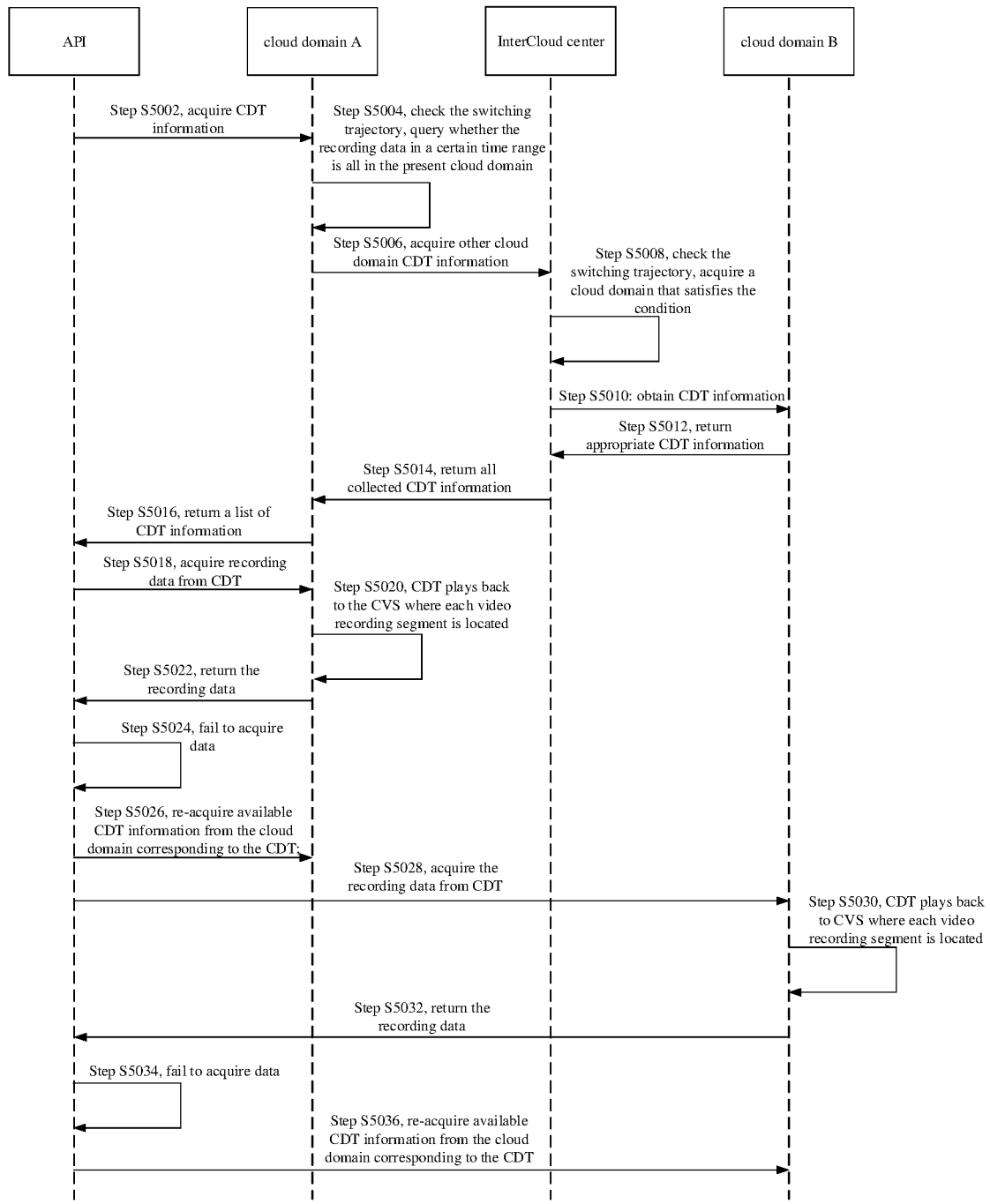

Optionally, FIG. 5(a) is a schematic flowchart of another optional data processing method based on cloud storage according to an embodiment of the present application. As shown in FIG. 5(a), the method further includes:

Step S502, when the cloud work device receives a request for acquiring information on a data forwarding server sent by the client, determining, according to a storage trajectory of the IP camera, whether the information on a data forwarding server in the cloud management device needs to be acquired;

Step S504, if the cloud work device determines that the information on the data forwarding server in the cloud management device needs to be acquired, sending the information on the data forwarding server in the cloud management device to the client;

Step S506: if the cloud work device determines that the information on the data forwarding server in the cloud management device does not need to be acquired, sending information on the data forwarding server in the cloud work device to the client.

Optionally, FIG. 5(b) is a schematic flowchart of another optional data processing method based on cloud storage according to an embodiment of the present application. As shown in FIG. 5(b), the data processing method based on cloud storage can also include the following steps.

Step S5002, the API acquires CDT (Cloud Data Transfer) information from the cloud domain A;

Step S5004, the cloud domain A checks the switching trajectory, and queries whether the recording data is all in the present cloud domain in a certain time range;

Step S5006, the API acquires CDT information of other cloud domains from the InterCloud;

Step S5008, the InterCloud checks the switching trajectory, and acquires a cloud domain that satisfies a condition;

Step S5010: the InterCloud obtains CDT information from the cloud domain B;

Step S5012, the cloud domain B returns appropriate CDT information to the InterCloud;

Step S5014, the InterCloud returns all collected CDT information to the cloud domain A;

Step S5016, the cloud domain A returns a list of CDT information to the API;

Step S5018: the API acquires recording data from the cloud domain A corresponding to the CDT information;

Step S5020, the cloud domain A corresponding to the CDT information plays back to a CVS where each video recording segment is located;

Step S5022, the cloud domain A returns the recording data to the API;

Step S5024, the API fails to acquire data;

Step S5026, the API re-acquires available CDT information to the cloud domain corresponding to the CDT information;

Step S5028, the API acquires the recording data from the cloud domain B corresponding to the CDT information;

Step S5030, the cloud domain B corresponding to the CDT information plays back to a CVS where each video recording segment is located;

Step S5032, the cloud domain B returns the recording data to the API;

Step S5034, the API fails to acquire data;

Step S5036, the API re-acquires available CDT information to the cloud domain B corresponding to the CDT information.

It should be noted that the CDT is a data forwarding server, which is disposed in each cloud domain and is only responsible for data forwarding of the present cloud domain. For the request of the API, the InterCloud can give appropriate CDT information and its corresponding time range according to the strategy switching situation (storage trajectory, etc.), and the CDT information may indicate multiple CDTs. Therefore, the API can request for the playback of video recording in the corresponding time according to the information list of all CDTs returned by the InterCloud. In addition, video playback is performed via an encoder ID and time range request. If a cloud domain is switched, the data requested by a user may be in both the cloud work device and the cloud backup device.

Optionally, the CVM (Cloud Video Management device) in the cloud storage manages the signaling scheduling and recording index, and the data is actually stored in the CVS (Cloud Video Storage), and the playback by the API to the CDT only tells the encoder ID and time range. The CDT needs to further query the CVM for the specific storage location of video recording, and then the CDT requests a specific CVS for the playback of the video recording (synonymous with the video in the previous embodiment).

Figure 6:
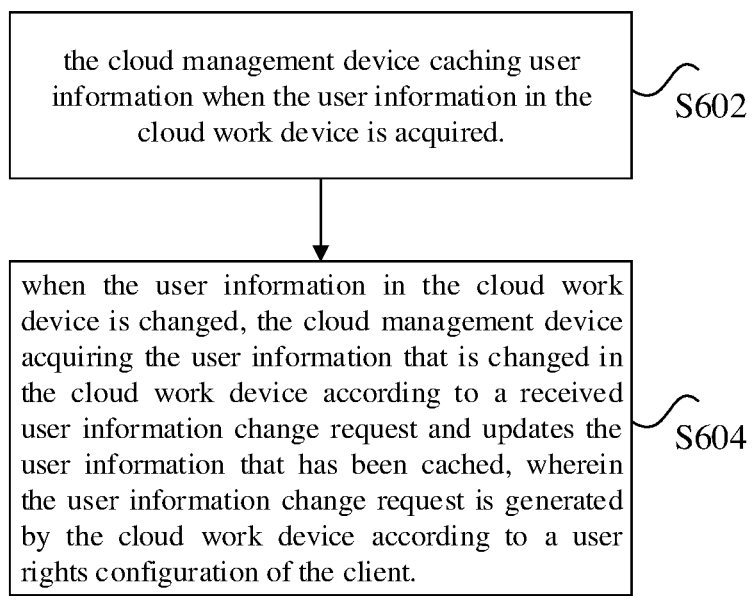
FIG. 6(a) is a schematic flowchart diagram of another optional data processing method based on cloud storage according to an embodiment of the present application.
FIG. 6(b) is a schematic flowchart diagram of another optional data processing method based on cloud storage according to an embodiment of the present application.
Figure 6:
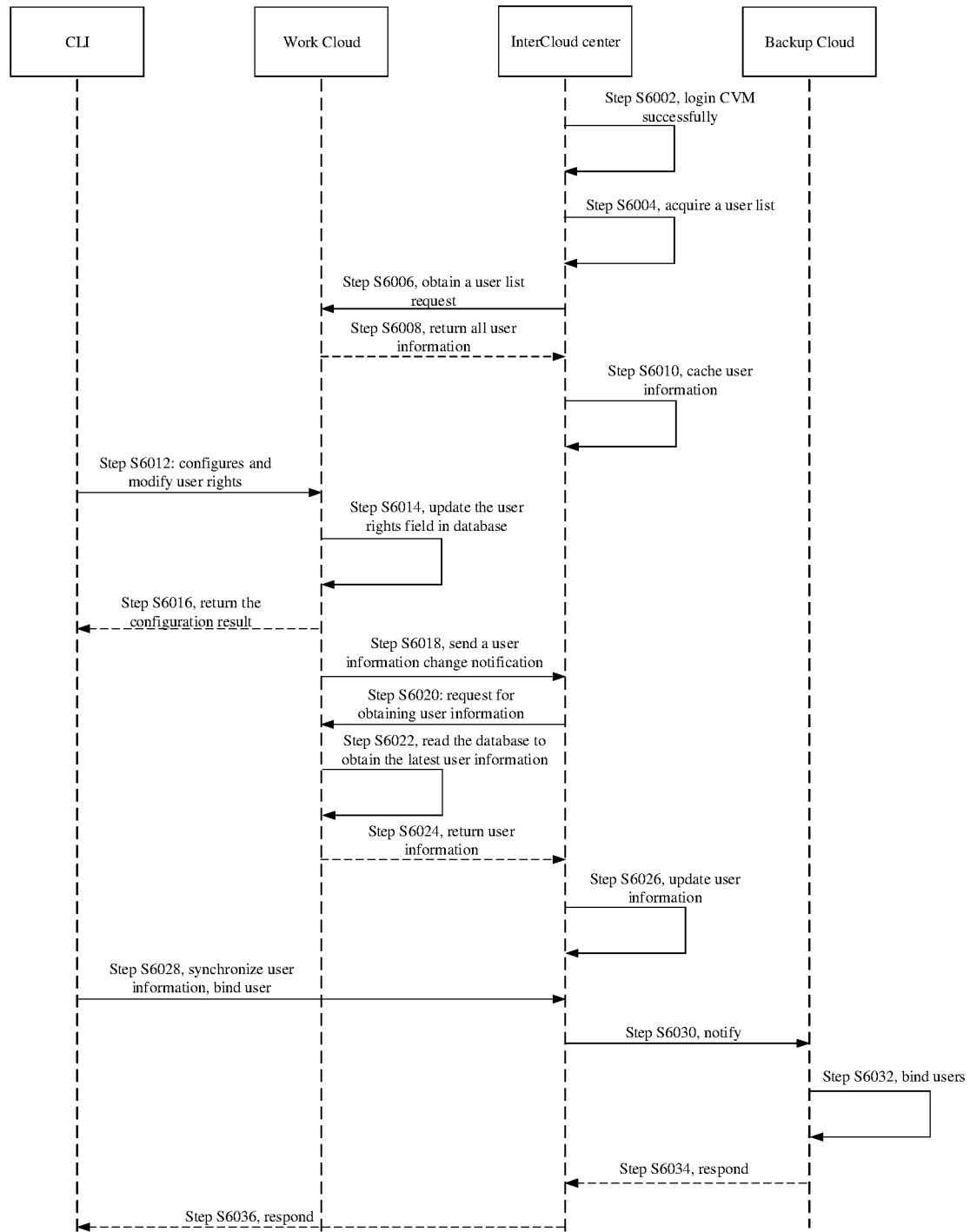

Optionally, FIG. 6(*a*) is a schematic flowchart of another optional data processing method based on cloud storage according to an embodiment of the present application. As shown in FIG. 6(*a*), before the client sends a data query request via the cloud work device, the method also includes:

Step S602, the cloud management device caching user information after the user information in the cloud work device is acquired;

Step S604, when the user information in the cloud work device is changed, the cloud management device acquiring the user information that is changed in the cloud work device according to a received user information change request and updating the user information that has been cached, wherein the user information change request is generated by the cloud work device according to a user right configuration of the client.

Optionally, the method may further include instructing the cloud backup device to perform user binding when the cloud management device receives a user binding request sent by the client; and instructing the cloud backup device to synchronize the user information when the cloud management device receives a user information synchronization request sent by the client.

Optionally, the method may further include: determining, by the cloud management device, whether a fault occurs in the cloud work device, if the cloud management device determines that a fault occurs in the cloud work device, instructing the IP camera to store the media data in the cloud backup device. Specifically, the cloud management device may, according to a preset strategy, instruct data of the IP camera to be automatically switched and stored in the cloud backup device when a fault occurs in the cloud work device, thereby preventing data loss.

It should be noted that, under conventional situations in the related art, if the cloud work device works abnormally, the media data is generally lost. However, in this embodiment, the cloud management device may store the media data in the cloud backup device based on the preset strategy when detecting that the cloud work device works abnormally, thereby ensuring the integrity of the media data in the IP camera. In summary, the data processing method based on cloud storage in the present embodiments can effectively prevent data loss among clouds, thereby improving the security of data among clouds.

Optionally, FIG. 6(*b*) is a schematic flowchart of another optional data processing method based on cloud storage according to an embodiment of the present application. As shown in FIG. 6(*b*), the data processing method based on cloud storage can also include the following steps.

Step S6002, the InterCloud login CVM successfully;

Step S6004, the InterCloud acquires a user list;

Step S6006, the InterCloud obtains a user list request from the Work Cloud;

Step S6008, the Work Cloud returns all user information to the InterCloud;

Step S6010, the InterCloud caches user information;

Step S6012: the CLI configures the Work Cloud and modifies user rights;

Step S6014, the Work Cloud updates user rights field in database;

Step S6016, the Work Cloud returns a configuration result to the CLI;

Step S6018, the Work Cloud sends a user information change notification to the InterCloud;

Step S6020: the InterCloud requests the Work Cloud for user information;

Step S6022, the Work Cloud reads the database to obtain the latest user information;

Step S6024, the Work Cloud returns user information to the InterCloud;

Step S6026, the InterCloud updates user information;

Step S6028, the CLI synchronizes user information and binds the user to the InterCloud;

Step S6030, the InterCloud notifies the Backup Cloud;

Step S6032, the Backup Cloud binds the user;

Step S6034, the Backup Cloud responds to the InterCloud;

Step S6036, the Backup Cloud responds to the CLI.

Optionally, in the above step S6030 to step S6036, the CLI (Comman-Line Interface) refers to an interface of WEB management interface operation of the InterCloud. Based on the above method, the security of user data in a cloud domain can be improved, that is, when a user intends to write or read data from the current cloud domain to other cloud domains, the user must first have control rights or read and write rights of other cloud domains.

Optionally, the cloud management device of the present embodiment provides a perfect solution for solving the problems that the unified management among cloud domains is complex and data is lost when a fault occurs in the single cloud domain, and has a broad application prospect in the urban video surveillance field. In addition, the cloud management device can perform data redundancy among multiple clouds according to a strategy. Even in the case that a single cloud domain is completely paralyzed, the video surveillance service can be kept uninterrupted and data is not lost. The cloud management device can maintain the switching trajectory, and the normal extraction of the cloud storage data is not affected without sending the data back, thereby reducing the pressure on the bandwidth of sending the data back.

It should be noted that, for the above method embodiments, for the sake of simple description, they are all expressed as combinations of a series of actions. But those skilled in the art should understand that the present application is not limited by the described order of actions, and certain steps may be performed in other order or concurrently in accordance with the present application. In the following, those skilled in the art should also understand that the embodiments described in the specification are all preferred embodiments, and the actions and modules involved are not necessarily required by the present application.

From the description of the above embodiments, those skilled in the art can clearly understand that the method according to the above embodiments can be implemented by means of software plus a necessary general hardware platform, and of course, by a hardware. But in many cases, the former is a better implementation. Based on such understanding, the technical solution of the present application, or the part which is essential or contributes to the prior art, may be embodied in the form of a software product. The computer software product is stored in a storage medium (such as a ROM/RAM, a magnetic disk, a compact disc), includes a number of instructions for causing a terminal device (which may be a mobile phone, a computer, a server, or a network device, etc.) to perform the methods described in various embodiments of the present application.

Embodiment 2

Figure 7:
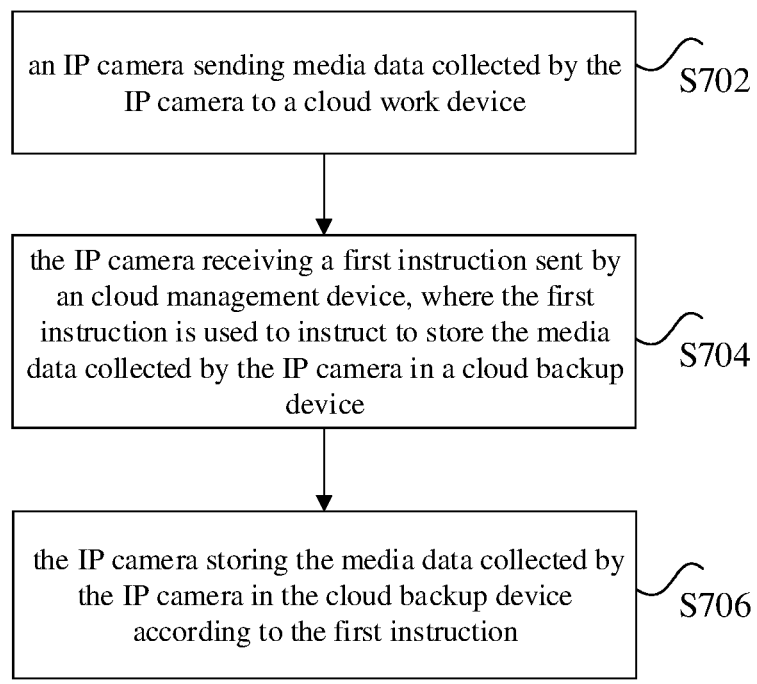
FIG. 7 is a schematic flowchart of another optional data processing method based on cloud storage according to an embodiment of the present application.

An optional data processing method based on cloud storage is provided according to an embodiment of the present application. FIG. 7 is a schematic flowchart of another optional data processing method based on cloud storage according to an embodiment of the present application. As shown in FIG. 7, the method includes:

Step S702, an IP camera sending media data collected by the IP camera to a cloud work device;

Step S704, the IP camera receiving a first instruction sent by a cloud management device, where the first instruction is used to instruct the IP camera to store the media data collected by the IP camera in a cloud backup device;

Step S706, the IP camera storing the media data collected by the IP camera in the cloud backup device according to the first instruction.

Optionally, the IP camera is a digital device based on network transmission. In addition to the common composite video signal output interface BNC (in general, an analog output is used for debugging, it does not represent its own effect), the IP camera also has a network output interface, which can directly connect the camera to a local network. Each IP camera has its own IP address, data processing function and built-in application software, which can be used as a web server, FTP (File Transfer Protocol) server, FTP client and mailbox client. The IP camera also includes other special functions such as motion detection, alarm signal output/input, and mail functions. In this embodiment, the configuration of the IP camera requires to have respective IP address of the present cloud domain and the cloud management device, network communication port (Port), user name, and password.

Optionally, the IP camera can preferentially exchange media data with the cloud work device. When the cloud work device works abnormally, the cloud management device can allocate a suitable cloud backup device to the IP camera according to a strategy (storage trajectory, etc.). The IP camera can directly interact with or store images in the cloud backup device allocated by the cloud management device, until the allocated cloud backup device is unavailable, thereby applying for an available cloud backup device once again. It should be noted that the reason that the cloud backup device is unavailable may be that the storage space is full, or there is a fault in itself.

Figure 8:
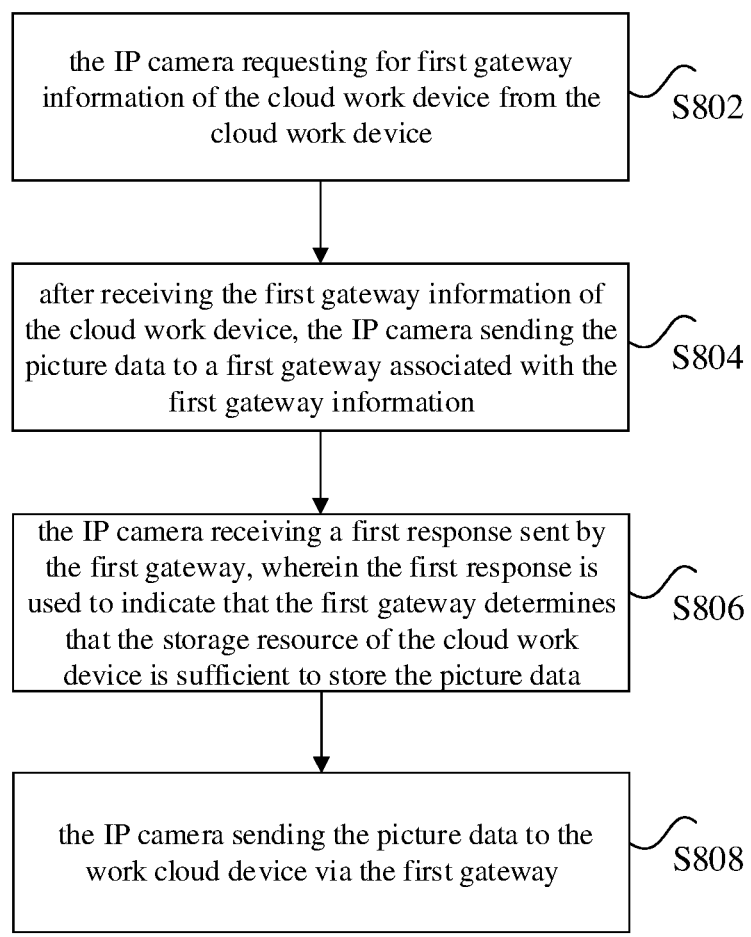
FIG. 8(a) is a schematic flowchart diagram of another optional data processing method based on cloud storage according to an embodiment of the present application.
FIG. 8(b) is a schematic flowchart diagram of another optional data processing method based on cloud storage according to an embodiment of the present application.
Figure 8:
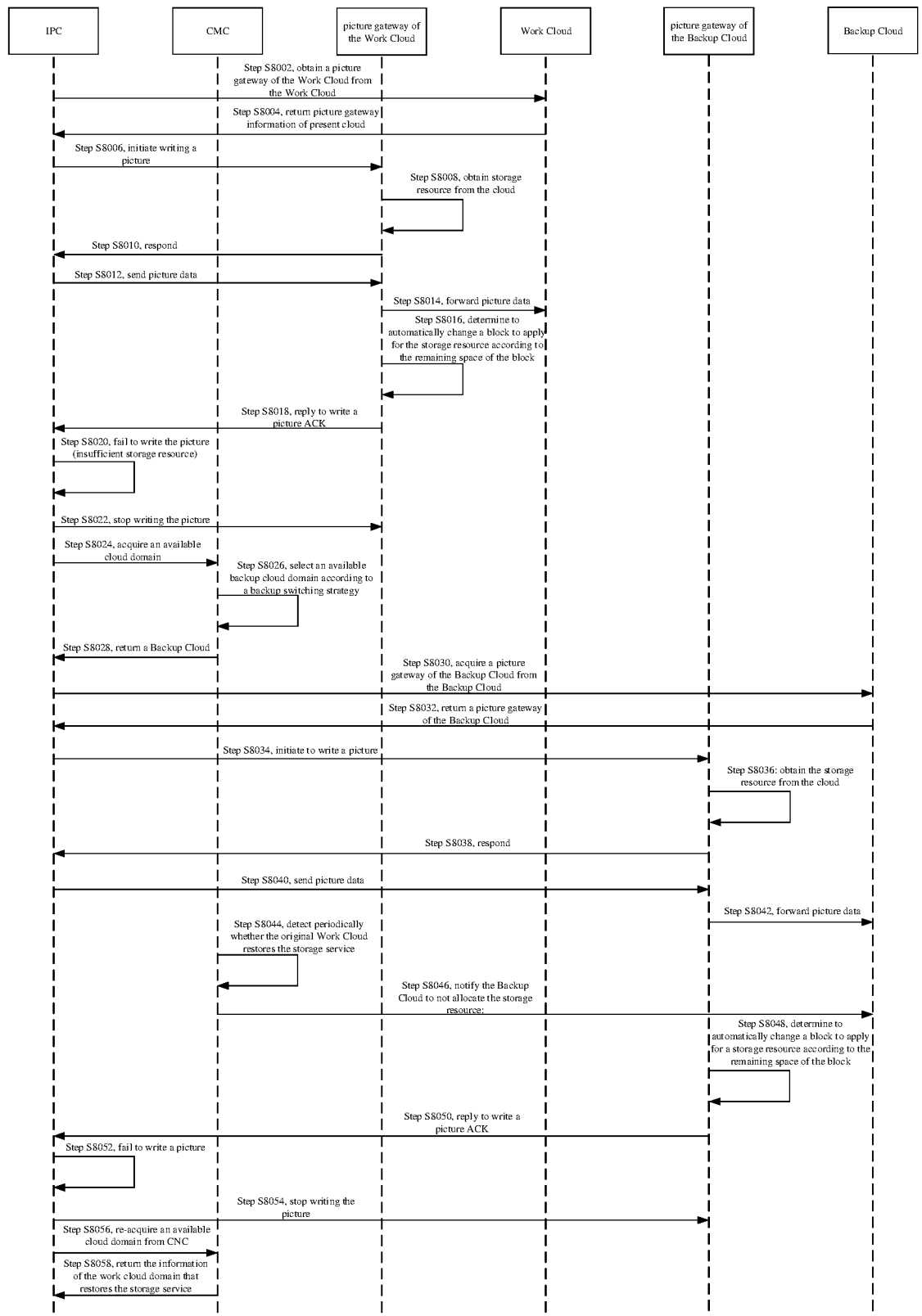

Optionally, FIG. 8(a) is a schematic flowchart of another optional data processing method based on cloud storage according to an embodiment of the present application. As shown in FIG. 8(a), the media data includes picture data, and the step of the IP camera sending the media data collected by the IP camera to the cloud work device includes:

Step S802, the IP camera requesting the cloud work device for first gateway information of the cloud work device;

Step S804, after receiving the first gateway information of the cloud work device, the IP camera sending picture data to a first gateway associated with the first gateway information;

Step S806, the IP camera receiving a first response sent by the first gateway, wherein the first response is used to indicate that the first gateway determines that the storage resource of the cloud work device is sufficient to store the picture data;

Step S808, the IP camera sending the picture data to the work cloud device via the first gateway.

Optionally, the picture management and video management of the IP camera can be independent with each other. When a picture is directly stored, an IP camera in the related art stores the picture directly with the lane ID it manages, and the IP camera does not have a unique ID identifier. Different from the above, the IP camera in the embodiment of the present application preferentially interacts with the local cloud work device when applying for a picture gateway, and can carry the IP address of the original cloud work device, thereby facilitating the switching, due to abnormality of the original cloud work device, to a cloud backup device to write the image. After the original cloud work device domain returns to normal, the IP camera can be notified timely to write back to the previous cloud work device.

The fact that the picture can be stored directly means that the IP camera directly stores the picture data into the cloud storage system, thereby sparing the process of accessing the picture to the server.

Optionally, FIG. 8(b) is a schematic flowchart of another optional data processing method based on cloud storage according to an embodiment of the present application. As shown in FIG. 8(b), the data processing method based on cloud storage can also include the following steps.

Step S8002, the IP camera obtains a picture gateway of a Work Cloud from the Work Cloud;

Step S8004, the Work Cloud returns picture gateway information of present cloud to the IP camera;

Step S8006, the IP camera initiates writing a picture to the picture gateway of the Work Cloud;

Step S8008, the picture gateway of the Work Cloud obtains storage resource from the present cloud;

Step S8010, the picture gateway of the Work Cloud responds to the IP camera;

Step S8012, the IP camera sends the picture data to the picture gateway of the Work Cloud;

Step S8014, the picture gateway of the Work Cloud forwards picture data to the Work Cloud;

Step S8016, the picture gateway of the Work Cloud determines to automatically change a block to apply for the storage resource according to the remaining space of the block;

Step S8018, the picture gateway of the Work Cloud replies to the IP camera to write a picture ACK;

Step S8020, the IP camera fails to write the picture (the storage resource is insufficient);

Step S8022, the IP camera notifies the picture gateway of the Work Cloud to stop writing the picture;

Step S8024, the IP camera acquires an available cloud domain from the InterCloud;

Step S8026, the InterCloud selects an available backup cloud domain according to a backup switching strategy;

Step S8028, the InterCloud returns a Backup Cloud to the IP camera;

Step S8030, the IP camera acquires a picture gateway of the Backup Cloud from the Backup Cloud;

Step S8032, the Backup Cloud returns the picture gateway of the Backup Cloud to the IP camera;

Step S8034, the IP camera initiates to write a picture to the picture gateway of the Backup Cloud;

Step S8036: the picture gateway of the Backup Cloud obtains the storage resource from the present cloud;

Step S8038, the picture gateway of the Backup Cloud responds to the IP camera;

Step S8040, the IP camera sends picture data to the picture gateway of the Backup Cloud;

Step S8042, the picture gateway of the Backup Cloud forwards the picture data to the Backup Cloud;

Step S8044, the InterCloud detects periodically whether the original Work Cloud restores the storage service;

Step S8046, the InterCloud notifies the Backup Cloud to not allocate storage resource;

Step S8048, the picture gateway of the Backup Cloud determines to automatically change a block to apply for a storage resource according to the remaining space of the block;

Step S8050, the picture gateway of the Backup Cloud replies to the IP camera to write a picture ACK;

Step S8052, the IP camera fails to write a picture;

Step S8054, the IP camera notifies the picture gateway of the Backup Cloud to stop writing the picture;

Step S8056, the IP camera re-acquires an available cloud domain from the InterCloud;

Step S8058, the InterCloud returns the information of the work cloud domain that restores the storage service to the IP camera.

Optionally, in the above step S8002 to step S8058, when the gateway applies for storage resource from the Work Cloud (that is, obtains available storage space), the Work Cloud synchronously informs the space capacity that can be used by this operation. Each time a picture is written, the capacity will be deducted until the space for this application is used up, then applying for storage resources again and continue to repeat. The above process is transparent to the IP camera, thus simplifying the operation of the IP camera. In addition, the Backup Cloud strategy of the InterCloud has already specified the information of the Backup Cloud. The InterCloud can periodically communicates with all the cloud domains to obtain the status and load pressure, and then select a Backup Cloud according to priorities when selecting a Backup Cloud. It should be noted that a Backup Cloud is selectable only if the capacity is sufficient and its workload is not exceeded.

Optionally, the step of the IP camera storing the media data collected by the IP camera in the cloud backup device according to the first instruction includes:

Step S10, the IP camera acquiring an address of the media data in the first instruction;

Step S12, the IP camera storing the media data in the cloud backup device according to the address.

Optionally, the management center can perform service switching management among cloud domains. When the cloud work device works abnormally, the user manually operates to switch service or the cloud management device automatically performs service switching according to a strategy, and the service of the abnormal cloud is switched to the cloud backup device. After the abnormal cloud domain returns to normal, the service is switched back and data is sent back according to the strategy to ensure the continuity of the video surveillance service (video, picture, etc.) and the integrity of the data.

Optionally, after the IP camera stores the media data collected by the IP camera in the cloud backup device according to the first instruction, the method further includes:

Step S20, the IP camera receiving a second instruction sent by the cloud management device, where the second instruction is used to instruct the IP camera to store the media data collected by the IP camera in the cloud work device;

Step S22, the IP camera storing the media data collected by the IP camera in the cloud work device according to the second instruction.

Optionally, the cloud management device in this embodiment supports automatically switching back the service after the original cloud work device returns to normal. If the local cloud work device works abnormally, the IP camera can apply for an available cloud backup device directly from the cloud management device according to a pre-configuration, and then obtain the picture gateway and write data to the cloud backup device until the original cloud work device corresponding to the IP camera returns to normal.

In the embodiment of the present application, the cloud management device receives the data query request sent by the client via the cloud work device, and queries whether the media data collected by the IP camera is stored in the cloud backup device by using the data query request; pushes the address of the media data to the cloud work device if the cloud management device determines by query that the media data of the IP camera is stored in the cloud backup device, thereby realizing the diversity of management and control among multiple cloud domains. Further, if the local cloud work device works abnormally, the IP camera can apply for an available cloud backup device directly from the cloud management device according to a pre-configuration, and in turn obtaining the picture gateway from the cloud backup device and writing data. In this way, the integrity and security of data is ensured, the continuity of the video surveillance service is improved, and the technical effect that normal operation is not affected in the case that the data in the cloud backup device is not sent back is achieved.

Embodiment 3

Figure 9:
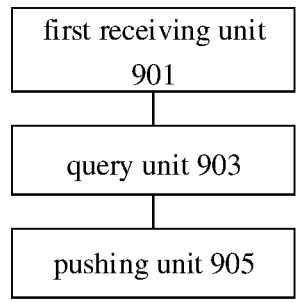
FIG. 9 is a schematic structural diagram of an optional data processing system based on cloud storage according to an embodiment of the present application.

According to an embodiment of the present application, a data processing system based on cloud storage is also provided. As shown in FIG. 9, a cloud management device in the system includes:

a first receiving unit 901, configured to receive a data query request sent by a client via a cloud work device, wherein the data query request is used to request for querying media data that has been stored in a cloud domain, and the cloud work device is a default storage cloud domain of an IP camera;

a query unit 903, configured to query whether the media data collected by the IP camera is stored in a cloud backup device according to the data query request;

and a pushing unit 905, configured to push an address of the media data to the cloud work device if it determines by query that the media data of the IP camera is stored in the cloud backup device according to the data query request, where the address of the media data is used for the client to request for querying the media data from the cloud backup device.

Optionally, the media data includes video data, the data query request includes a first time period. The pushing unit 905 includes: a query subunit, configured to query a storage trajectory of the IP camera in the first time period according to the data query request, wherein the storage trajectory records information on a cloud domain in which the video data is stored in each time period, the cloud domain including the cloud work device and the cloud backup device; a determining subunit, configured to determine whether the storage trajectory records information on the cloud backup device; a determining unit, configured to determine that the video data collected by the IP camera is stored in the cloud backup device if it is determined that the storage trajectory records the information on the cloud backup device.

Optionally, the pushing unit 905 may include a pushing subunit, configured to push an address of the media data to the cloud work device, and to push the time period associated with the video data stored in the cloud backup device to the cloud work device.

Optionally, the media data includes video data, and the client in the system includes: a requesting unit, configured to request for video data stored during a first preset time period from the cloud backup device according to the address of the media data; and a second receiving unit, configured to receive first video data returned by the cloud work device, where the first video data is video data stored by the cloud backup device during the first preset time period.

Optionally, the cloud work device in the system includes: a first determining unit, configured to determine, according to the storage trajectory of the IP camera, whether information on a data forwarding server in the cloud management device needs to be acquired when receiving a request for acquiring the information on the data forwarding server sent by the client; a first processing unit, configured to send the information on the data forwarding server in the cloud management device to the client if it is determined that the information on the data forwarding server in the cloud management device needs to be acquired; a second processing unit, configured to send information on a data forwarding server in the cloud work device to the client if it is determined that the information on the data forwarding server in the cloud management device does not need to be acquired.

Optionally, the cloud management device in the system may further include: a first storage unit, configured to cache user information when the user information in the cloud work device is acquired; and a third processing unit, configured to acquire user information that is changed in the cloud work device according to a received user information change request and updating the user information that has been cached when the user information in the cloud work device is changed, wherein the user information change request is generated by the cloud work device according to a user right configuration of the client.

Optionally, the cloud management device in the system may further include: a first instructing unit, configured to instruct the cloud backup device to perform user binding when receiving a user binding request sent by the client; and a second instructing unit, configured to instruct the cloud backup device to synchronize the user information when receiving a user information synchronization request sent by the client.

Optionally, the data processing system based on cloud storage may further include: a second determining unit, configured to determine whether a fault occurs in the cloud work device; and a second storage unit, configured to instruct the IP camera to store the media data in the cloud backup device if it is determined that a fault occurs in the cloud work device.

In the embodiment of the present application, the cloud management device receives the data query request sent by the client via the cloud work device, and queries whether the media data collected by the IP camera is stored in the cloud backup device by using the data query request; pushes the address of the media data to the cloud work device if the cloud management device determines by query that the media data of the IP camera is stored in the cloud backup device, thereby enhancing the diversity of management and control among multiple cloud domains and solving the technical problem of poor flexibility of data storage among multiple cloud domains in the related art. Further, if the local cloud work device works abnormally, the IP camera can apply for an available cloud backup device directly from the cloud management device according to a pre-configuration, and in turn obtain the picture gateway from the cloud backup device and write in data. In this way, the integrity and security of data is ensured, the continuity of the video surveillance service is improved, and the technical effect that normal operation is not affected in the case that the data in the cloud backup device is not sent back is achieved.

Embodiment 4

Figure 10:
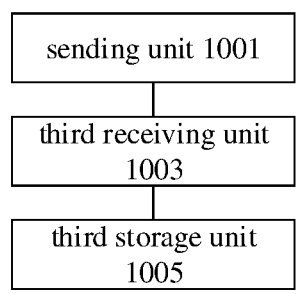
FIG. 10 is a schematic structural diagram of another optional data processing system based on cloud storage according to an embodiment of the present application.

According to an embodiment of the present application, a data processing system based on cloud storage is also provided. As shown in FIG. 10, an IP camera in the system includes:

a sending unit 1001, configured to send media data collected by the IP camera to a cloud work device;

a third receiving unit 1003, configured to receive a first instruction sent by a cloud management device, where the first instruction is used to instruct the IP camera to store the media data collected by the IP camera to a cloud backup device;

and a third storage unit 1005, configured to store the media data collected by the IP camera in the cloud backup device according to the first instruction.

Optionally, the media data includes picture data, and the sending unit includes: a requesting subunit, configured to request for first gateway information of the cloud work device from the cloud work device; a first sending subunit, configured to send the picture data to a first gateway associated with the first gateway information after receiving the first gateway information of the cloud work device; a receiving subunit, configured to receive a first response sent by the first gateway, wherein the first response is used to indicate that the first gateway determines that storage resource of the cloud work device is sufficient to store the picture data; a second sending subunit, configured to send the picture data to the work cloud device via the first gateway.

Optionally, the third storage unit includes: an acquiring subunit, configured to acquire an address of the media data in the first instruction; and a storage subunit, configured to store the media data in the cloud backup device according to the address.

Optionally, the cloud management device in the system further includes: a fourth receiving unit, configured to receive a second instruction sent by the cloud management device, where the second instruction is used to instruct the IP camera to store the media data collected by the IP camera to the cloud work device; and a fourth storage unit, configured to store the media data collected by the IP camera in the cloud work device according to the second instruction.

In the embodiment of the present application, the cloud management device receives the data query request sent by the client via the cloud work device, and queries whether the media data collected by the IP camera is stored in the cloud backup device by using the data query request; pushes the address of the media data to the cloud work device if the cloud management device determines by query that the media data of the IP camera is stored in the cloud backup device, thereby enhancing the diversity of management and control among multiple cloud domains and solving the technical problem of poor flexibility of data storage among multiple cloud domains in the related art. Further, if the local cloud work device works abnormally, the IP camera can apply for an available cloud backup device directly from the cloud management device according to a pre-configuration, and in turn obtain the picture gateway from the cloud backup device and write in data. In this way, the integrity and security of data is ensured, the continuity of the video surveillance service is improved, and the technical effect that normal operation is not affected in the case that the data in the cloud backup device is not sent back is achieved.

Embodiment 5

Figure 11:
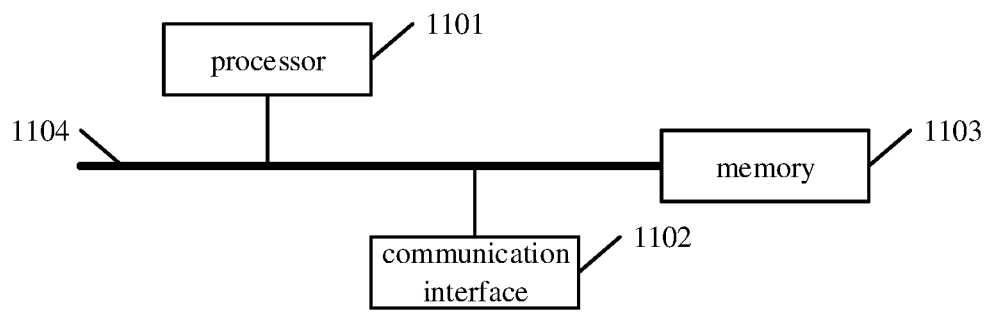
FIG. 11 is a schematic structural diagram of an electronic device according to an embodiment of the present application.

According to an embodiment of the present application, an electronic device is also provided. As shown in FIG. 11, the electronic device includes a processor 1101, a communication interface 1102, a memory 1103, and a communication bus 1104, wherein the processor 1101, the communication interface 1102, and the memory 1103 communicate with each other via the communication bus 1104.

The memory 1103 is configured to store a computer program.

The processor 1101 is configured to implement the data processing method based on cloud storages of embodiments 1 and 2 by executing the program stored on the memory 1103.

Embodiment 6

According to an embodiment of the present application, a computer readable storage medium is also provided, in which a computer program is stored. The computer program is executed by a processor to implement the data processing method based on cloud storage of embodiments 1 and 2.

Embodiment 7

According to an embodiment of the present application, a computer program is also provided. The computer program, when executed, implements the data processing method based on cloud storage of embodiments 1 and 2.

The serial numbers of the embodiments of the present application are merely for description, and do not represent the advantages and disadvantages of the embodiments.

In the above embodiments of the present application, the description for each embodiment focuses on the differences from other embodiments, and the parts that are not detailed in a certain embodiment can be referred to the related descriptions of other embodiments.

In the several embodiments provided by the present application, it should be understood that the disclosed technical contents may be implemented in other manners. The system embodiment, the electronic device embodiment, the computer readable storage medium embodiment, and the computer program embodiment are only schematic, for example, the division of units is only a logical function division, and there may be different dividing manners in actual implementations. For example, multiple units or components may be combined or integrated into another system, or some features may be omitted or not performed. In addition, the mutual coupling or direct coupling or communication connection shown or discussed may be an indirect coupling or communication connection via some interfaces, units or modules, and may be electrical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the present embodiments.

In addition, each functional unit in each embodiment of the present application may be integrated into one processing unit, or each unit may exist physically separately, or two or more units may be integrated into one unit. The above integrated unit can be implemented in the form of hardware or in the form of a software functional unit.

The integrated unit, if implemented in the form of a software functional unit and sold or used as an independent product, may be stored in a computer readable storage medium. Based on such understanding, the technical solution of the present application or the all or part of the technical solution that contributes to the prior art may be embodied in the form of a software product stored in a storage medium, which includes a number of instructions to cause a computer device (which may be a personal computer, server or network device, etc.) to perform all or part of the steps of the methods described in various embodiments of the present application. The above storage medium includes: a USB key, a Read-Only Memory (ROM), a Random Access Memory (RAM), a removable hard disk, a magnetic disk, or a CD, and other mediums that can store program codes.

The above is only the preferred embodiments of the present application, and is not intended to limit the present application. Any modifications, equivalent substitutions, improvements and the like made within the spirit and principles of the present application, should fall within the protection scope of the present application.

What is claimed is:

1. A data processing method based on cloud storage, comprising:
    a cloud management device receiving a data query request sent by a client via a cloud work device, wherein the data query request is used to request for querying media data that has been stored in a cloud domain, the cloud work device is a default storage cloud domain of an IP (Internet Protocol) camera;
    the cloud management device querying whether media data collected by the IP camera is stored in a cloud backup device according to the data query request; and
    if the cloud management device determines that the media data of the IP camera is stored in the cloud backup device according to the data query request, pushing an address of the media data to the cloud work device, wherein the address of the media data is used for the client to request for querying the media data from the cloud backup device;

wherein the media data comprises video data, and the data query request comprises a first time period, the cloud management device querying whether media data collected by the IP camera is stored in a cloud backup device according to the data query request comprises:

the cloud management device querying a storage trajectory of the IP camera in the first time period according to the data query request, wherein the storage trajectory records information on a cloud domain in which the video data is stored in each time period, and the cloud domain comprises the cloud work device and the cloud backup device;

the cloud management device determining whether the storage trajectory records information on the cloud backup device; and if it is determined that the storage trajectory records the information on the cloud backup device, determining that the video data collected by the IP camera is stored in the cloud backup device.

2. The method according to claim 1, wherein pushing the address of the media data to the cloud work device comprises:

the cloud management device pushing the address of the media data to the cloud work device and pushing a time period associated with the video data stored in the cloud backup device to the cloud work device.

3. The method according to claim 1, wherein the media data comprises video data, and after pushing the address of the media data to the cloud work device, the method further comprises:

the client, according to the address of the media data, requesting for video data stored during a first preset time period from the cloud backup device; and the client receiving first video data returned by the cloud work device, wherein the first video data is video data stored in the cloud backup device during the first preset time period.

4. The method according to claim 3, wherein the method further comprises:

determining, according to the storage trajectory of the IP camera, whether information on a data forwarding server in the cloud management device needs to be acquired when the cloud work device receives a request for acquiring the information on the data forwarding server sent by the client;

if the cloud work device determines that the information on the data forwarding server in the cloud management device needs to be acquired, sending the information on the data forwarding server in the cloud management device to the client; and if the cloud work device determines that the information on the data forwarding server in the cloud management device does not need to be acquired, sending information on a data forwarding server in the cloud work device to the client.

5. The method according to claim 1, wherein before the client sends a data query request via the cloud work device, the method further comprises:

the cloud management device caching user information when the user information in the cloud work device is acquired; and when the user information in the cloud work device is changed, the cloud management device acquiring the user information that is changed in the cloud work device according to a received user information change request and updating the user information that has been cached, wherein the user information change request is generated by the cloud work device according to a user right configuration of the client.

6. The method according to claim 1, wherein the method further comprises the cloud management device instructing the cloud backup device to perform user binding when receiving a user binding request sent by the client; and the cloud management device instructing the cloud backup device to synchronize the user information when receiving a user information synchronization request sent by the client.

7. The method according to claim 3, wherein the method further comprises:

the cloud management device determining whether a fault occurs in the cloud work device;

if the cloud management device determines that a fault occurs in the cloud work device, instructing the IP camera to store the media data in the cloud backup device.

8. A data processing method based on cloud storage, comprising:

an IP camera sending media data collected by the IP camera to a cloud work device;

the IP camera receiving a first instruction sent by a cloud management device, wherein the first instruction is used to instruct the IP camera to store the media data collected by the IP camera in a cloud backup device; and the IP camera storing the media data collected by the IP camera in the cloud backup device according to the first instruction;

wherein the media data comprises picture data, and the IP camera sending the media data collected by the IP camera to the cloud work device comprises:

the IP camera requesting for first gateway information of the cloud work device from the cloud work device;

after receiving the first gateway information of the cloud work device, the IP camera sending the picture data to a first gateway associated with the first gateway information;

the IP camera receiving a first response sent by the first gateway, wherein the first response is used to indicate that the first gateway determines that storage resource of the cloud work device is sufficient to store the picture data; and the IP camera sending the picture data to the work cloud device via the first gateway.

9. The method according to claim 8, wherein the IP camera storing the media data collected by the IP camera in the cloud backup device according to the first instruction comprises:

the IP camera acquiring an address of the media data in the first instruction; and the IP camera storing the media data in the cloud backup device according to the address.

10. The method according to claim 9, wherein after the IP camera stores the media data collected by the IP camera in the cloud backup device according to the first instruction, the method further comprises:

the IP camera receiving a second instruction sent by the cloud management device, wherein the second instruction is used to instruct the IP camera to store the media data collected by the IP camera to the cloud work device; and the IP camera storing the media data collected by the IP camera in the cloud work device according to the second instruction.

11. An electronic device, wherein the electronic device comprises a processor, a communication interface, a memory, and a communication bus, wherein the processor, the communication interface, and the memory communicate with each other via the communication bus;

the memory is configured to store a computer program;

the processor is configured to implement the method according to claim 1 when executing the program stored in the memory.

12. A computer readable non-transitory storage medium, wherein a computer program is stored in the computer readable non-transitory storage medium, and the computer program is executed by a processor to implement the method according to claim 1.

13. An electronic device, wherein the electronic device comprises a processor, a communication interface, a memory, and a communication bus, wherein the processor, the communication interface, and the memory communicate with each other via the communication bus;

the memory is configured to store a computer program;

the processor is configured to implement the method according to claim 8 when executing the program stored in the memory.

14. A computer readable non-transitory storage medium, wherein a computer program is stored in the computer readable non-transitory storage medium, and the computer program is executed by a processor to implement the method according to claim 8.

* * * * *